US012019881B1

United States Patent
Therene

(10) Patent No.: US 12,019,881 B1
(45) Date of Patent: *Jun. 25, 2024

(54) REDUCED POWER CONSUMPTION BY SSD USING HOST MEMORY BUFFER

(71) Applicant: Marvell Asia Pte Ltd, Singapore (SG)

(72) Inventor: Christophe Therene, Livermore, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,731

(22) Filed: Apr. 10, 2023

Related U.S. Application Data

(63) Continuation of application No. 17/469,450, filed on Sep. 8, 2021, now Pat. No. 11,625,173.

(60) Provisional application No. 63/076,260, filed on Sep. 9, 2020.

(51) Int. Cl.
| | |
|---|---|
| *G06F 3/06* | (2006.01) |
| *G06F 11/10* | (2006.01) |
| *G06F 12/0804* | (2016.01) |
| *G06F 13/16* | (2006.01) |

(52) U.S. Cl.
CPC .......... *G06F 3/0625* (2013.01); *G06F 3/0634* (2013.01); *G06F 3/068* (2013.01); *G06F 11/1068* (2013.01); *G06F 12/0804* (2013.01); *G06F 13/1668* (2013.01); *G06F 2212/1032* (2013.01)

(58) Field of Classification Search
CPC ......... G06F 2212/1032; G06F 13/1668; G06F 12/0804; G06F 11/1068; G06F 3/0625; G06F 3/0634; G06F 3/068
See application file for complete search history.

(56) References Cited

U.S. PATENT DOCUMENTS

| | | | |
|---|---|---|---|
| 7,814,329 B1 | 10/2010 | Hutchison et al. | |
| 8,074,112 B1 | 12/2011 | Chang et al. | |
| 8,856,423 B1 | 10/2014 | Sutardja | |
| 9,081,716 B1 | 7/2015 | Karmarkar | |
| 9,213,401 B2 | 12/2015 | Sakarda | |
| 9,563,382 B2 | 2/2017 | Hahn et al. | |
| 11,625,173 B1 * | 4/2023 | Therene | G06F 11/1068 |
| | | | 714/764 |
| 2013/0031388 A1 | 1/2013 | Sakarda | |
| 2013/0191582 A1 | 7/2013 | Shiwalkar et al. | |
| 2014/0351675 A1 * | 11/2014 | Tiziani | G06F 3/0659 |
| | | | 713/320 |
| 2016/0026406 A1 | 1/2016 | Hahn et al. | |

(Continued)

*Primary Examiner* — Guy J Lamarre

(57) ABSTRACT

A controller of a solid state drive (SSD) device, in response to determining that the SSD device is to transition to a power saving mode: transfers information from at least some of a volatile memory of an SSD device controller of the SSD device to a host memory of a host computer via a communication interface; and transitions the at least some of the volatile memory to an OFF state to reduce power consumption of the SSD device. In response to determining that the SSD device is to transition from the power saving mode to a normal operating mode, the controller also: transitions the at least some of the volatile memory to an ON state in which the at least some of the volatile memory is configured to retain data; and transfers the information from the host memory to the volatile memory of the SSD device controller via the communication interface.

20 Claims, 9 Drawing Sheets

(56) References Cited

U.S. PATENT DOCUMENTS

2017/0242606 A1    8/2017   Maiko et al.
2019/0179685 A1    6/2019   Ki
2022/0197368 A1    6/2022   Liang et al.

\* cited by examiner

REDUCED POWER CONSUMPTION BY SSD USING HOST MEMORY BUFFER

CROSS REFERENCES TO RELATED APPLICATIONS

The present application is a continuation of U.S. application Ser. No. 17/469,450, filed on Sep. 8, 2021, entitled "Reduced Power Consumption by SSD Using Host Memory Buffer," which claims the benefit of U.S. Provisional Patent Application No. 63/076,260, entitled "Reduced Lowest Power Consumption Using Host Memory Buffer (HMB) in SSD," filed on Sep. 9, 2020. Both of the applications referenced above are hereby incorporated by reference herein their entireties.

FIELD OF TECHNOLOGY

The present disclosure relates generally to non-volatile memory devices, and more particularly to power saving techniques for non-volatile memory devices.

BACKGROUND

Many solid state drive (SSD) devices provide a power saving mode of operation that provides a significant reduction in power consumed by the SSD drive as compared to an active mode of operation of the SSD device. In many usage scenarios, the SSD is put into the power-saving mode very frequently. In the power saving mode, much of the circuitry in the SSD device is shut down to conserve power. However, typical SSD devices include a volatile memory (e.g., static random-access memory (SRAM)) that stores information that is used by the SSD device during the active mode; At least some of the information stored in the volatile memory is needed in order for the SSD to enter and exit the power save mode frequently and quickly, and resume normal operation quickly when exiting the power save mode, it is necessary for the SSD to maintain, while in the power save mode, a large amount of data and state information that is normally stored in the volatile memory. For example, the volatile memory may store information such as i) cached or buffered write data received from a host and that is to be eventually written to non-volatile memory of the SSD, ii) internal data structures used by firmware being executed by one or more central processing units (CPUs) of the SSD device, etc. Thus, the entire volatile memory cannot simply be shut down when the SSD device goes into the power save mode.

At least when other circuitry of the SSD device (such as processors, control circuitry, etc.) is shut down in the power saving mode, the volatile memory (such as SRAM) is responsible for a significant amount of power consumed by the SSD device. In one approach to reduce the amount of power consumed by the volatile memory during the power saving mode, banks of the volatile memory that do not store information necessary for transitioning the SSD device back to the normal mode and resuming operation are shut down, whereas other banks of the volatile memory that do store information necessary for transitioning the SSD device back to the normal mode are put into a retention mode in which the stored information is retained but power consumption is reduced as compared to a normal mode of operation of the volatile memory.

To enable more of the volatile memory to be shut down (as opposed to being put into the retention mode) to further reduce power consumption, some information can be moved from the volatile memory to the non-volatile memory. However, moving information from the volatile memory to the non-volatile memory and vice versa significantly increases the amount of time necessary to transition from the active mode to the power saving mode (sometime referred to as "entrance latency"), and vice versa (sometime referred to as "resume latency"). Additionally, an SSD device typically transitions to and from the power saving mode relatively frequently, and because the non-volatile memory of an SSD typically can be written only a finite number of times during its lifetime, the repeated moving of information to the non-volatile memory when transitioning to power saving mode may reduce the lifespan of the SSD device. Similarly, the repeated reading of information from the non-volatile memory when exiting the power saving mode may cause wear on the non-volatile memory and consequently cause read disturb errors to increase.

SUMMARY

In an embodiment, an apparatus for reducing power consumed by a solid state drive (SSD) device comprises a controller that includes at least one of i) a processor and a memory, the processor being configured to execute machine readable instructions stored in the memory, and ii) hardware circuitry. The controller is configured to, in response to determining that the SSD device is to transition to a power saving mode: transfer information from at least some of a volatile memory of an SSD device controller of the SSD device to a host memory of a host computer via a communication interface; and transition the at least some of the volatile memory to an OFF state to reduce power consumption of the SSD device. The controller is further configured to, in response to determining that the SSD device is to transition from the power saving mode to a normal operating mode: transition the at least some of the volatile memory to an ON state in which the at least some of the volatile memory is configured to retain data; and transfer the information from the host memory to the volatile memory of the SSD device controller via the communication interface.

In another embodiment, a method for reducing power consumed by an SSD device having non-volatile memory and volatile memory includes, in response to determining that the SSD device is to transition to a power saving mode: controlling direct memory access (DMA) circuitry to transfer information from the volatile memory of the SSD device to a host memory of a host computer via a communication interface; and generating control signals to transition at least some of the volatile memory of the SSD device to the OFF state to reduce power consumption of the SSD device. The method also includes, in response to determining that the SSD device is to transition from the power saving mode to a normal operating mode: generating control signals to transition the at least some of the volatile memory of the SSD device to an ON state in which the volatile memory is capable of retaining data; and controlling the DMA circuitry to transfer the information from the host memory to the volatile memory of the SSD device via the communication interface.

DETAILED DESCRIPTION

In embodiments described below, a controller of a solid state drive (SSD) device transfers information in a volatile memory of the SSD device (sometimes referred to herein as "SSD volatile memory") to a memory of a host (sometimes referred to herein as "host memory") in connection with the SSD device transitioning from a normal operating mode to a power saving mode. The information that is transferred includes information (sometimes referred to herein as "dynamic information" for brevity) that cannot simply be discarded and is necessary for the SSD device to transition back to the normal operating mode from the power saving mode and resume operation, such as one or more of i) cached write data that has not yet been written to non-volatile memory (NVM) of the SSD device, ii) state information of one or more controllers of the SSD drive, etc. By transferring the dynamic information from the SSD volatile memory to the host memory, some or all of the SSD volatile memory can be powered down during the power saving mode to increase power savings as compared to some prior art SSD devices in which a significantly larger portion of the volatile memory is kept powered on in order to retain the dynamic information, at least according to some embodiments. Also, by transferring the dynamic information to the host memory, entrance latency and/or wear on the NVM is reduced as compared to some prior art SSD devices in which dynamic information is transferred to the NVM when transitioning to the power saving mode, at least according to some embodiments.

Similarly, in embodiments described below, the controller of the SSD device transfers the dynamic information from the host memory back to the SSD volatile memory in connection with the SSD device transitioning from the power saving mode back to the normal operating mode. Because the dynamic information is transferred from the host memory, resume latency and/or wear on the NVM is reduced as compared to some prior art SSD devices in which dynamic information is transferred to the NVM when transitioning to the power saving mode and then transferred from the NVM when transitioning back to the normal operating mode, at least according to some embodiments.

Figure 1:
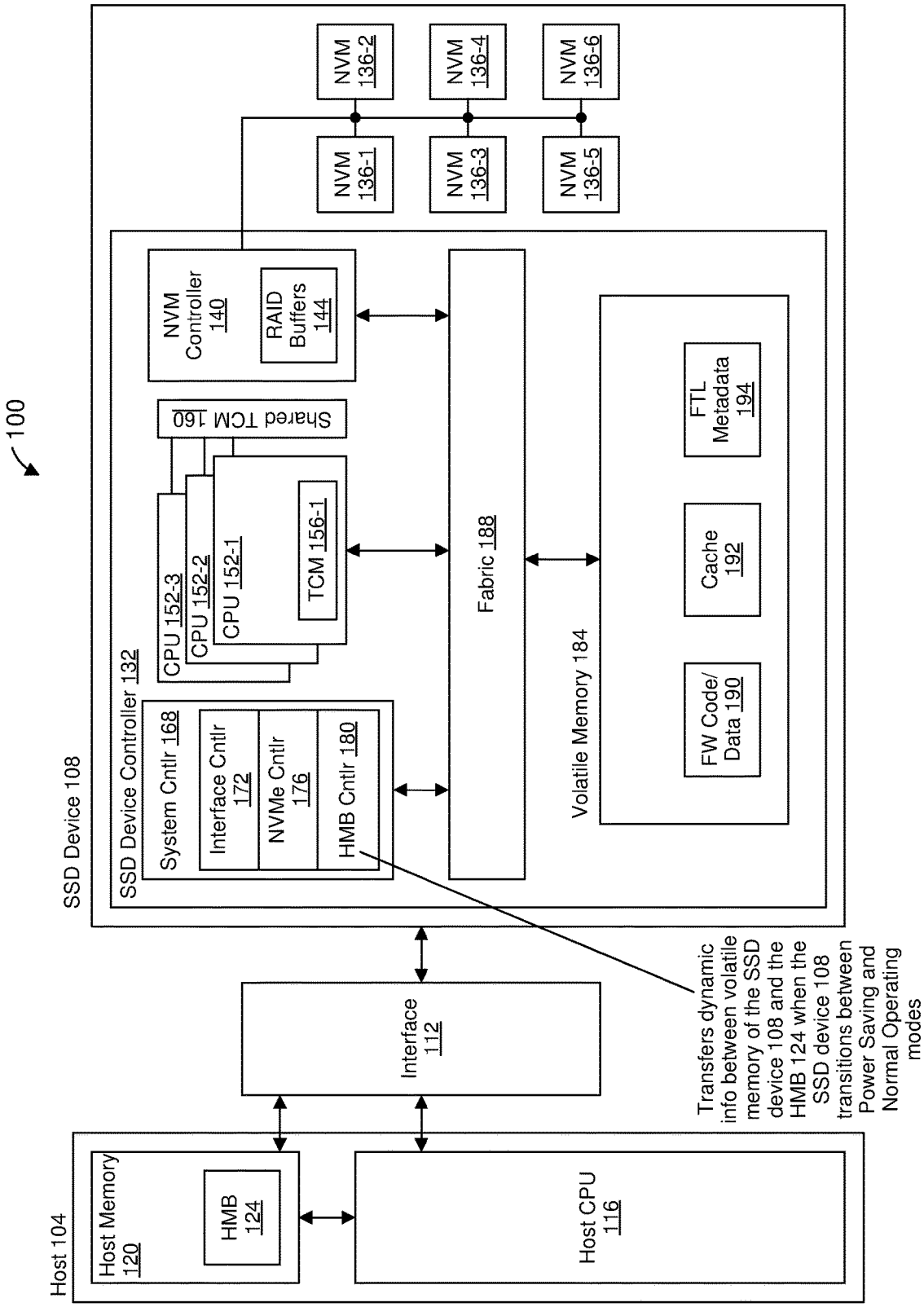
FIG. 1 is a diagram of an example system that includes a host communicatively coupled to a solid state drive (SSD) device that is configured to, in response to determining that the SSD device is to go into a power saving mode, transfer information from a volatile memory of the SSD device to a host memory to save the information while at least some of the volatile memory is put into a power saving state in which the at least some of the volatile memory is incapable of retaining data, according to an embodiment.

FIG. 1 is a diagram of an example system 100 that includes a host computing device 104 communicatively coupled to an SSD device 108 via a communication interface 112, according to an embodiment. In an embodiment, the communication interface 112 corresponds to the peripheral component interface express (PCIe) standard, and the communication interface 112 comprises a PCIe bus. In some embodiments in which the communication interface 112 corresponds to the PCIe standard, the communication interface 112 also includes a PCIe switch. In other embodiments, the communication interface 112 comprises a suitable interface other than PCIe, such as Infiniband, RapidIO, compute express link (CXL), etc.

The host computing device 104 comprises a host central processing unit (CPU) 116 communicatively coupled to a host memory 120. The host memory 120 includes a host memory buffer (HMB) 124. When the SSD device 108 is in a normal operating mode, the HMB 124 buffers read data that has been read from the SSD device 108, according to some embodiments. In other embodiments, the HMB 124 additionally or alternatively buffers write data to be written to the SSD device 108. As will be described in more detail below, the SSD device 108 also transfers dynamic information from volatile memory of the SSD device 108 to the HMB 124 in connection with the SSD device 108 transitioning to a power saving mode, and transfers the dynamic information from the HMB 124 back to the volatile memory of the SSD device 108 in connection with the SSD device 108 transitioning back to the normal operating mode.

The SSD device 108 comprises an SSD device controller 132 communicatively coupled to one or more NVM chips 136 (sometimes referred to herein as "the NVM chips 136" for brevity). Although six NVM chips 136 are illustrated in FIG. 1, the SSD device 108 comprises another suitable number of NVM chips 136 in various other embodiments, such as one, two, three, . . . , five, seven, eight, nine, etc. In an embodiment, the NVM chips 136 comprise one or more NAND flash chips. In another embodiment, the NVM chips 136 correspond to another suitable NVM technology other than NAND flash, e.g., phase-change memory (PCM), a ferroelectric random-access memory (FRAM), a magnetoresistive random-access memory (MRAM), etc.

The SSD device controller 132 comprises an NVM controller 140 that is configured to write data to and read data from the NVM chips 136, according to an embodiment. In some embodiments, the NVM controller 140 is also configured to perform functions related to redundant array of independent disks (RAID) storage of data in the NVM chips 136, as will be described further below.

The NVM controller 140 generally is configured to operate in accordance with non-volatile memory technology of the NVM chips 136. For example, the NVM controller 140 comprises a NAND flash controller when the NVM chips 136 comprise one or more NAND flash chips, according to an embodiment. The NVM controller 140 comprises another suitable type of NVM controller (e.g., a PCM controller, an FRAM controller, an MRAM controller, etc.) when the NVM chips 136 comprise one or more suitable NVM chips other than NAND flash chips (e.g., one or more PCM chips, one or more FRAM chips, one or more MRAM chips, etc.), according to another embodiment.

The NVM controller 140 comprises a processor that executes machine readable instructions that cause the NVM controller 140 to perform functions such as described above, in some embodiments. The NVM controller 140 additionally or alternatively comprises hardware circuitry (e.g., a hardware state machine) configured to perform functions such as described above, in some other embodiments.

In an embodiment in which the NVM controller 140 is configured to perform functions related to RAID storage, the NVM controller 140 comprises one or more RAID buffers 144 that store data that is in the process of being striped to the NVM chips 136. The one or more RAID buffers 144 are implemented using volatile memory such as one or more registers, random access memory (RAM) such as static RAM (SRAM), dynamic RAM (DRAM), or another suitable RAM, etc., according to various embodiments. Losing data stored in the one or more RAID buffers when the SSD 108 goes into the power saving mode can compromise data reliability and may lead to significant data loss. However, because of memory access speed requirements of the NVM controller 140, lifetime write limits of NVMs such as flash memories, and/or cost constraints, it is impractical to use an NVM for the buffers 144, at least in some embodiments.

The SSD device controller 132 also comprises one or more central processing units (CPUs) 152 that are configured to perform functions such as one or more of i) wear leveling to distribute writes evenly across NVM blocks in the NVM chips 136, ii) garbage collection, iii) mapping host side logical block addresses (LBAs) to physical addresses of the NVM chips 136, etc., according to various embodiments.

In an embodiment, each of the CPUs 152 includes respective tightly coupled memory (TCM) 156 that stores one or both of i) machine readable instructions being executed by the CPU 152, and ii) data upon which the CPU 152 is operating. In some embodiments, multiple CPUs 152 are coupled to shared TCM 160 that stores data upon which the multiple CPUs 152 are operating.

The TCMs 156 and the shared TCM 160 are implemented using volatile memory such as one or more registers, RAM such as SRAM, DRAM, or another suitable RAM, etc., according to various embodiments. Losing instructions and/or data stored in the TCMs 156 and the shared TCM 160 when the SSD 108 goes into the power saving mode may cause the one or more CPUs 152 to crash and/or generate incorrect data and/or control signals. However, because of memory access speed requirements of the CPUs 152, lifetime write limits of NVMs such as flash memories, and/or cost constraints, it is impractical to use NVMs for the TCMs 156, 160, at least in some embodiments.

The SSD device controller 132 also comprises a system controller 168 that performs functions associated with general control of the SSD Device 108 and control of communications with the host 104, according to an embodiment.

The system controller 168 includes a communication interface controller 172 that is configured to perform functions associated with the communication interface 112. For example, in embodiments in which the communication interface 112 corresponds to the PCIe standard, the communication interface controller 172 comprises a PCIe controller that is configured to control communications with the host 104 via the communication interface 112. In embodiments in which the communication interface 112 does not correspond to the PCIe standard, the communication interface controller 172 is configured to control communications via another suitable communication interface 112, such as Infiniband, RapidIO, CXL, etc.

In some embodiments in which the SSD device 108 communicates with the host 104 according to the non-volatile memory express (NVMe) standard, the system controller 168 also includes an NVMe controller 176 that is configured to control communications with the host 104 according to the NVMe standard. For example, in embodiments in which the communication interface 112 corresponds to the PCIe standard, the communication interface controller 172 comprises a PCIe controller that is configured to control communications with the host 104 via the communication interface 112. In embodiments in which the communication interface 112 does not correspond to the PCIe standard, the communication interface controller 172 is configured to control communications via another suitable communication interface 112, such as Infiniband, RapidIO, CXL, etc.

The system controller 168 also comprises an HMB controller 180 that performs functions associated with transferring data from volatile memory of the SSD device 108 to the HMB 124 via the communication interface 112 in connection with the SSD device 108 transitioning to the power saving mode. In connection with the SSD device 108 transitioning from the power saving mode to a normal operating mode, the HMB controller 180 performs functions associated with transferring data back to the volatile memory of the SSD device 108 from the HMB 124 via the communication interface 112. In an embodiment, the HMB controller 180 comprises direct memory access (DMA) circuitry for transferring data between the volatile memory of the SSD device 108 and the HMB 124. Operation of the HMB controller 180 will be described in more detail below.

The system controller 168 comprises one or more processors that execute machine readable instructions that cause the one or more processors to perform functions such as described above, in some embodiments. For example, in an embodiment, each of the communication interface controller 172, the NVMe controller 176, and the HMB controller 180 comprises a respective processor. In another embodiment, at least two of the communication interface controller 172, the NVMe controller 176, and the HMB controller 180 comprises a single processor. The system controller 168 additionally comprises hardware circuitry (e.g., one or more hardware state machines) configured to perform functions such as described above, in some other embodiments.

The SSD device controller 132 also comprises a volatile memory 184 such as one or more SRAMs, one or more DRAMs, etc. The NVM controller 140, the one or more CPUs 152, and the system controller 168 are communicatively coupled to the volatile memory 184 via a suitable fabric 188. The volatile memory 184 comprises machine readable instructions (e.g., firmware code, software code, etc.) and/or data 190 (FW code/data 190) corresponding to one or more of i) the NVM controller 140, ii) the one or more CPUs 152, and iii) the system controller 168. For example, machine readable instructions that are executed by one or more of i) the NVM controller 140, ii) the one or more CPUs 152, and iii) the system controller 168, are stored in the volatile memory 184, in some embodiments. Similarly, data upon which one or more of i) the NVM controller 140, ii) the one or more CPUs 152, and iii) the system controller 168, operates are stored in the volatile memory 184, in some embodiments. Losing information in the FW code/data 190 may cause one or processors (corresponding to one or more of i) the NVM controller 140, ii) the one or more CPUs 152, and iii) the system controller 168) to crash and/or generate incorrect data and/or control signals. However, because of memory access speed requirements of the NVM controller 140, the one or more CPUs 152, and/or the system controller 168, lifetime write limits of NVMs such as flash memories, and/or cost constraints, it is impractical to use an NVM for the memory 184, at least in some embodiments.

In some embodiments, the volatile memory 184 additionally or alternatively stores a cache 192 (or buffer) that stores i) write data that that is to be written to the NVM chips 136 and that was transferred from the host 104 via the communication interface 112, and/or ii) read data that was read from the NVM chips 136 and is to be transferred to the host 104 via the communication interface 112. Losing data in the buffer 192 may cause errors in writing and/or reading data to/from the NVM chips 136.

In some embodiments, the volatile memory 184 additionally or alternatively stores metadata 194 maintained by a flash translation layer (FTL) (the FTL metadata 194) that is being implemented by one or both of i) the NVM controller 140, and ii) the one or more CPUs 152. The FTL metadata includes information that tracks various information (e.g., one or more of read disturb counters, write cursors, RAID buffers, defect list, block information, system metadata, etc.) about the FTL that is being updated at run-time. Losing FTL metadata 194 when the SSD device 108 goes into the power saving mode may cause errors in data being written to the NVM chips 136 and reduce the reliability of data stored on the NVM chips 136.

Figure 2:
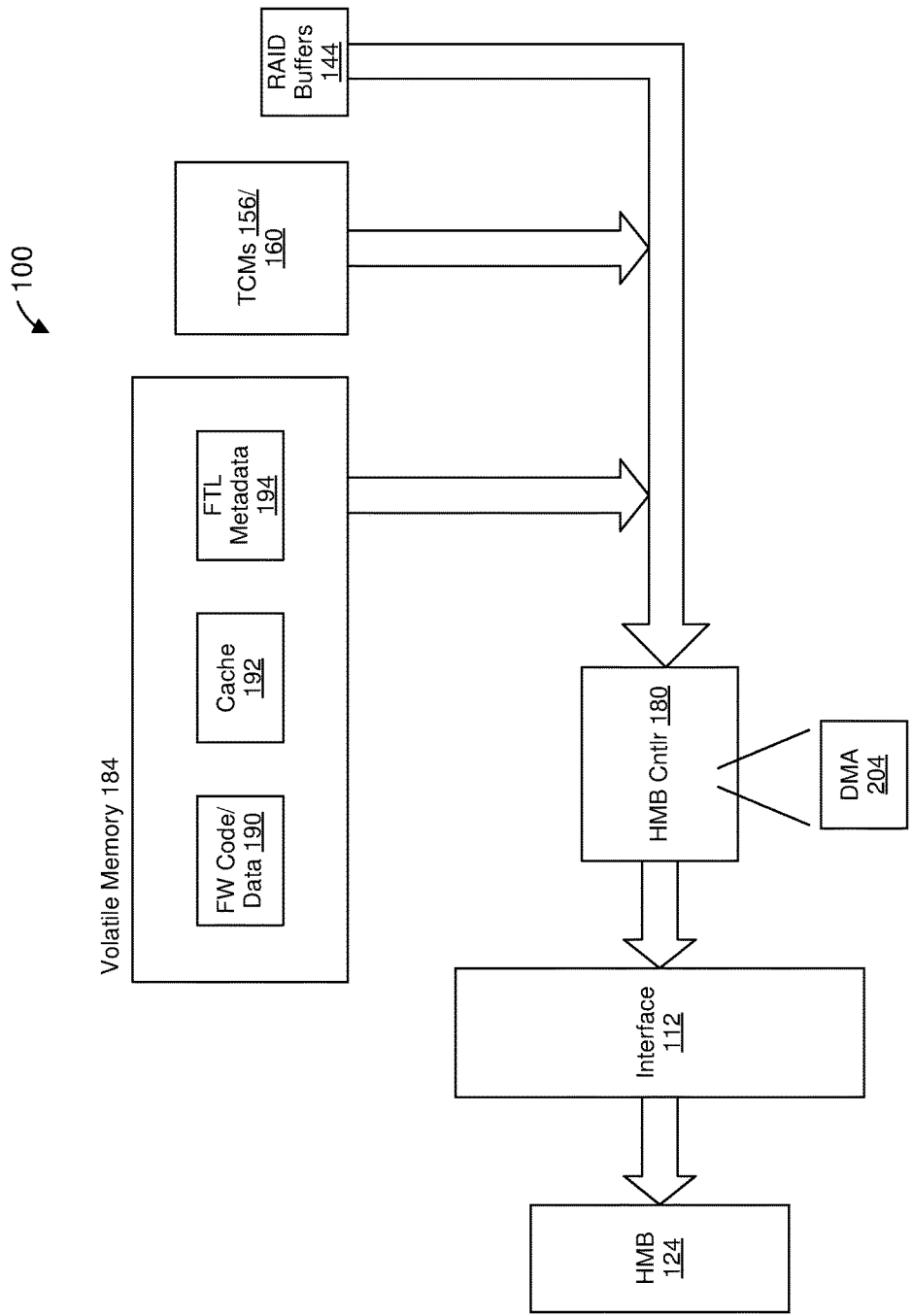
FIG. 2 is a simplified functional diagram illustrating transfer of data from volatile memory of the SSD device of FIG. 1 to the host memory in connection with the SSD device transitioning to the power saving mode, according to an embodiment.

As mentioned above, the HMB controller 180 performs functions associated with transferring data from volatile memory of the SSD device 108 to the HMB 124 via the communication interface 112 in connection with the SSD device 108 transitioning to the power saving mode, and performs functions associated with transferring data back to the volatile memory of the SSD device 108 from the HMB 124 via the communication interface 112 in connection with the SSD device 108 transitioning from the power saving mode to the normal operating mode, according to some embodiments. FIG. 2 is a simplified functional diagram illustrating the HMB controller 180 transferring data from volatile memory of the SSD device 108 to the HMB 124 via the communication interface 112 in connection with the SSD device 108 transitioning to the power saving mode, according to an embodiment.

As discussed previously, the SSD device 108 comprises one or more volatile memories that store dynamic information, such as the volatile memory of (or coupled to) the NVM controller 140 (e.g., the RAID buffer(s) 144), the one or more TCMs 156/160, and the volatile memory 184. In an embodiment, the HMB controller 180 transfers dynamic information stored in one of, or any suitable combination of two or more of, the volatile memor(ies) of the SSD device 108 to the HMB 124 via the interface 112 in connection with the SSD device 108 transitioning to the power saving mode, such as from the normal operating mode. After the dynamic information stored in the one of, or any suitable combination of two or more of, the volatile memor(ies) of the SSD device 108 are transferred to the HMB 124, some or all of the volatile memor(ies) of the SSD device 108 are shut down to conserve power, as will be described in more detail below.

In an embodiment, the HMB controller 180 transfers dynamic information from the volatile memory 184 to the HMB 124 via the interface 112 in connection with the SSD device 108 transitioning to the power saving mode. For example, in various illustrative embodiments, the HMB controller 180 transfers one of, or any suitable combination of two or more of, i) the firmware code and/or data 190, ii) the cache 192, iii) the FTL metadata 194, etc. In an embodiment, after the dynamic information is transferred from the volatile memory 184 to the HMB 124, some or all of the volatile memory 184 is shut down to conserve power, as will be described in more detail below.

Additionally or alternatively, the HMB controller 180 transfers dynamic information from one of, or any suitable combination of two or more of, the TCMs 156/160 to the HMB 124 via the interface 112 in connection with the SSD device 108 transitioning to the power saving mode. In one embodiment, the HMB controller 180 transfers dynamic information from one of, or any suitable combination of two or more of, the TCMs 156/160 to the volatile memory 184 in connection with the SSD device 108 transitioning to the power saving mode, and then transfers the dynamic information (including the dynamic information that was originally stored in the TCMs 156/160) from the volatile memory 184 to the HMB 124 via the interface 112 in connection with the SSD device 108 transitioning to the power saving mode. In another embodiment, the HMB controller 180 transfers dynamic information from one of, or any suitable combination of two or more of, the TCMs 156/160 directly to the HMB 124 via the interface 112 (i.e., without first storing the dynamic information from the one or more TCMs 156/160 in the volatile memory 184) in connection with the SSD device 108 transitioning to the power saving mode. Direct transfer from the TCMs 156/160 to the HMB 124 will reduce entrance latency as compared to transfer from the TCMs 156/160 to volatile memory 184, and then from the volatile memory 184 to the HMB 124, at least in some embodiments.

In an embodiment, after the dynamic information is transferred from the one or more TCMs 156/160 to the HMB 124, some or all of the one or more TCMs 156/160 are shut down to conserve power, as will be described in more detail below.

Additionally or alternatively, the HMB controller 180 transfers dynamic information from the volatile memory of (or coupled to) the NVM controller 140 (e.g., the RAID buffer(s) 144), to the HMB 124 via the interface 112 in connection with the SSD device 108 transitioning to the power saving mode. In one embodiment, the HMB controller 180 transfers dynamic information from the volatile memory of (or coupled to) the NVM controller 140 (e.g., the RAID buffer(s) 144) to the volatile memory 184 in connection with the SSD device 108 transitioning to the power saving mode, and then transfers the dynamic information (including the dynamic information that was originally stored in the volatile memory of (or coupled to) the NVM controller 140 (e.g., the RAID buffer(s) 144)) from the volatile memory 184 to the HMB 124 via the interface 112 in connection with the SSD device 108 transitioning to the power saving mode. In another embodiment, the HMB controller 180 transfers dynamic information from the volatile memory of (or coupled to) the NVM controller 140 (e.g., the RAID buffer(s) 144) directly to the HMB 124 via the interface 112 (i.e., without first storing the dynamic information from the volatile memory of (or coupled to) the NVM controller 140 (e.g., the RAID buffer(s) 144) in the volatile memory 184) in connection with the SSD device 108 transitioning to the power saving mode. Direct transfer from the volatile memory of (or coupled to) the NVM controller 140 to the HMB 124 will reduce entrance latency as compared to transfer from the volatile memory of (or coupled to) the NVM controller 140 to volatile memory 184, and then from the volatile memory 184 to the HMB 124, at least in some embodiments.

In an embodiment, after the dynamic information is transferred from the volatile memory of (or coupled to) the NVM controller 140 (e.g., the RAID buffer(s) 144) to the HMB 124, some or all of the volatile memory of (or coupled to) the NVM controller 140 (e.g., the RAID buffer(s) 144) are shut down to conserve power, as will be described in more detail below.

In an embodiment, the HMB controller 180 includes DMA circuitry 204 that is configured to transfer dynamic information from the volatile memory 184 to the HMB 124 via the interface 112. In another embodiment, the DMA circuitry 204 additionally is configured to transfer dynamic information from one or both of i) one or more of the TCMs 156/160 to the volatile memory 184, and ii) the volatile memory of (or coupled to) the NVM controller 140 (e.g., the RAID buffer(s) 144), to the volatile memory 184. In another embodiment, the DMA circuitry 204 additionally is configured to transfer dynamic information from one or both of i) one or more of the TCMs 156/160 to the volatile memory 184, and ii) the volatile memory of (or coupled to) the NVM controller 140 (e.g., the RAID buffer(s) 144), directly to the HMB 124 via the interface 112. As discussed above, direct transfer to the HMB 124 will reduce entrance latency, as compared to transfer via the volatile memory 184.

Figure 3:
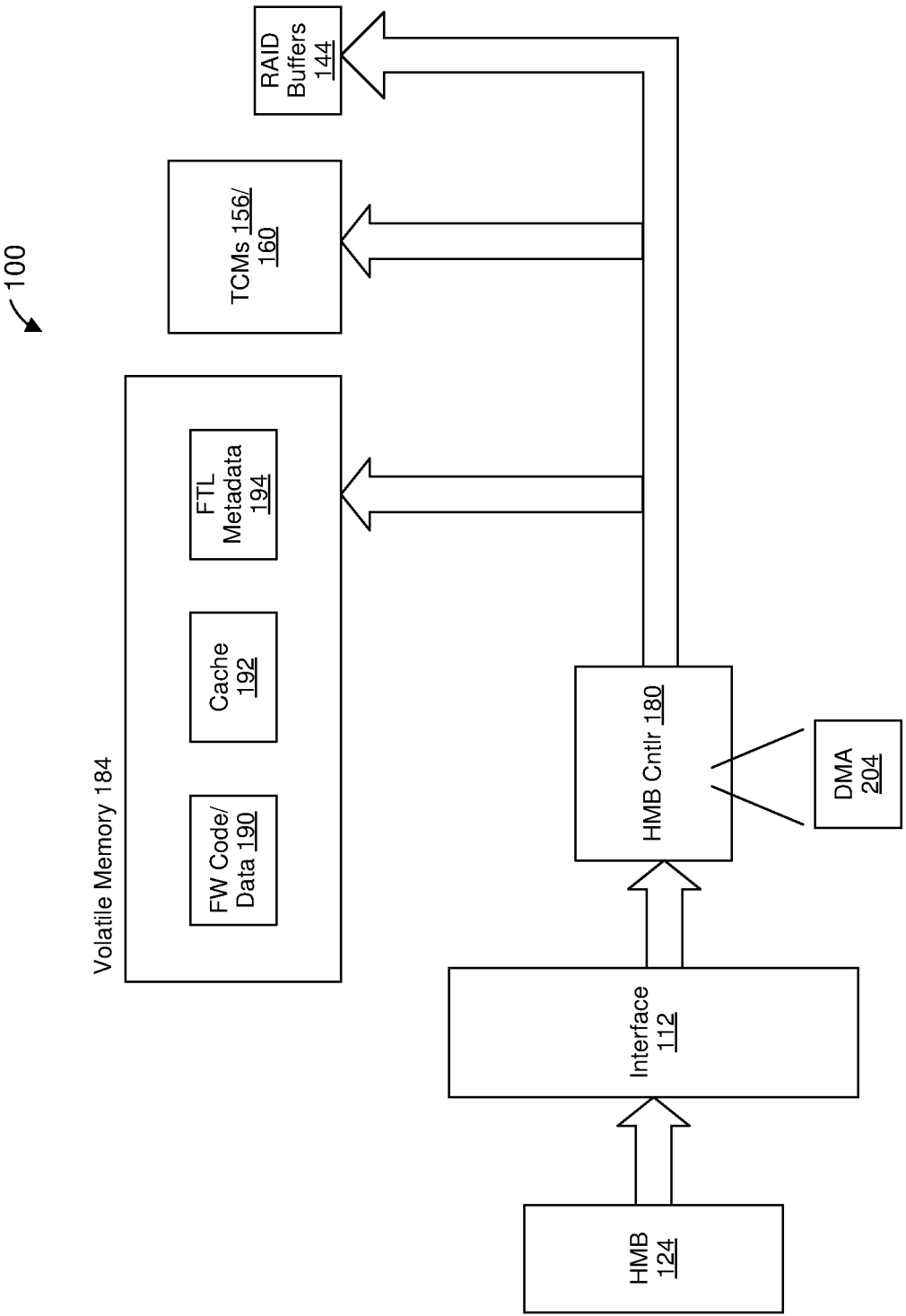
FIG. 3 is a simplified functional diagram illustrating transfer of data from the host memory to volatile memory of the SSD device of FIG. 1 in connection with the SSD device transitioning from the power saving mode to a normal mode of operation, according to an embodiment.

FIG. 3 is a simplified functional diagram illustrating the HMB controller 180 transferring data from the HMB 124 to volatile memory of the SSD device 108 via the communication interface 112 in connection with the SSD device 108 transitioning from the power saving mode to the normal mode of operation, according to an embodiment.

In an embodiment, the HMB controller 180 transfers dynamic information that was temporarily stored in the HMB 124 to one of, or any suitable combination of two or more of, the volatile memor(ies) of the SSD device 108 to the HMB 124 via the interface 112 in connection with the SSD device 108 transitioning from the power saving mode to the normal operating mode. Prior to the dynamic information being transferred, the volatile memor(ies) (or portions thereof) of the SSD device 108 that were shut down to conserve power are transitioned back to a normal operating mode, as will be described in more detail below.

In an embodiment, the HMB controller 180 transfers dynamic information from the HMB 124 to the volatile memory 184 via the interface 112 in connection with the SSD device 108 transitioning from the power saving mode to the normal operating mode. For example, in various illustrative embodiments, the HMB controller 180 transfers dynamic information from the HMB 124 to one of, or any suitable combination of two or more of, i) the firmware code and/or data 190, ii) the cache 192, iii) the FTL metadata 194, etc.

Additionally or alternatively, the HMB controller 180 transfers dynamic information from the HMB 124 to one of, or any suitable combination of two or more of, the TCMs 156/160 via the interface 112 in connection with the SSD device 108 transitioning from the power saving mode to the normal operating mode. In one embodiment, the HMB controller 180 transfers the dynamic information from the HMB 124 to the volatile memory 184, and then transfers the dynamic information from the volatile memory 184 to one of, or any suitable combination of two or more of, the TCMs 156/160 in connection with the SSD device 108 transitioning from the power saving mode to the normal operating mode. In another embodiment, the HMB controller 180 transfers dynamic information from the HMB 124 directly to one of, or any suitable combination of two or more of, the TCMs 156/160 via the interface 112 (i.e., without first storing the dynamic information in the volatile memory 184) in connection with the SSD device 108 transitioning from the power saving mode to the normal operating mode.

Additionally or alternatively, the HMB controller 180 transfers dynamic information from the HMB 124 to the volatile memory of (or coupled to) the NVM controller 140 (e.g., the RAID buffer(s) 144), via the interface 112 in connection with the SSD device 108 transitioning from the power saving mode to the normal operating mode. In one embodiment, the HMB controller 180 transfers dynamic information from the HMB 124 to the volatile memory 184, and then transfers the dynamic information from the volatile memory 184 to the volatile memory of (or coupled to) the NVM controller 140 (e.g., the RAID buffer(s) 144) in connection with the SSD device 108 transitioning from the power saving mode to the normal operating mode. In another embodiment, the HMB controller 180 transfers dynamic information from the HMB 124 directly to the volatile memory of (or coupled to) the NVM controller 140 (e.g., the RAID buffer(s) 144) via the interface 112 (i.e., without first storing the dynamic information in the volatile memory 184) in connection with the SSD device 108 transitioning from the power saving mode to the normal operating mode.

In an embodiment in which the HMB controller 180 includes the DMA circuitry 204, the DMA circuitry 204 is configured to transfer dynamic information from the HMB 124 to the volatile memory 184 via the interface 112. In another embodiment, the DMA circuitry 204 additionally is configured to transfer dynamic information from the volatile memory 184 to one or both of i) one or more of the TCMs 156/160 to the volatile memory 184, and ii) the volatile memory of (or coupled to) the NVM controller 140 (e.g., the RAID buffer(s) 144), to the volatile memory 184. In another embodiment, the DMA circuitry 204 additionally is configured to transfer dynamic information from the HMB 124 directly to one or both of i) one or more of the TCMs 156/160 to the volatile memory 184, and ii) the volatile memory of (or coupled to) the NVM controller 140 (e.g., the RAID buffer(s) 144), via the interface 112.

Figure 4:
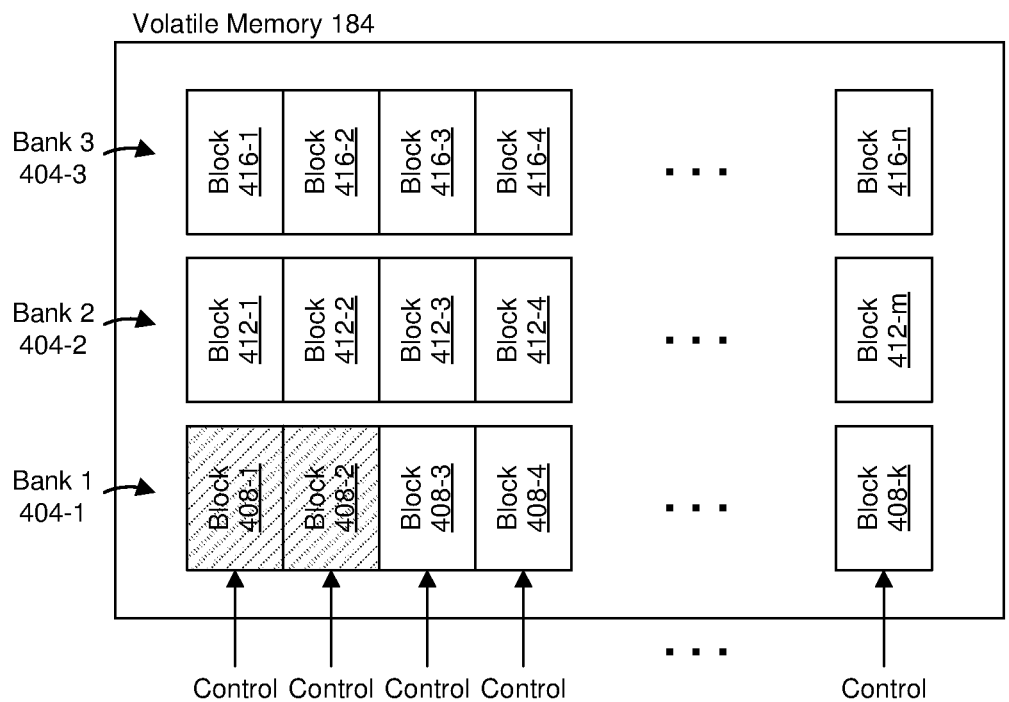
FIG. 4 is a diagram of an example of volatile memory of the SSD device of FIG. 1, according to an embodiment.

FIG. 4 is a diagram of the volatile memory 184 of FIG. 1, according to an embodiment. The volatile memory 184 comprises a plurality of banks 404 of memory blocks. Although FIG. 4 illustrates three banks 404, the volatile memory 184 includes another suitable number of banks 404 in other embodiments, such as one, two, four, five, etc. The bank 404-1 ("Bank 1") comprises k memory blocks 408, where k is a suitable positive integer. The bank 404-2 ("Bank 2") comprises m memory blocks 412, where m is a suitable positive integer. The bank 404-3 ("Bank 3") comprises n memory blocks 412, where n is a suitable positive integer. In some embodiments, k=m=n. In other embodiments, at least one of k, m, and n is different than one or both of the other ones of k, m, and n. In some embodiments, k, m, and n are at least two.

In an embodiment, each of the memory blocks 408, 412, and 416 comprises a memory block of size 128 kilobytes (kB). In other embodiments, each of the memory blocks 408, 412, and 416 comprises a memory block of another suitable size other than 128 kB, such as 16 kB, 32 kB, 64 kB, 96 kB, 256 kB, etc. In other embodiments, at least some of the memory blocks 408, 412, and 416 have different suitable sizes.

Each of the memory blocks 408, 412, and 416 is configured to receive a control signal that is used to transition the memory block amongst a set of multiple operating states (only control signals to memory blocks 408 are illustrated in FIG. 4 to simplify the figure). In an embodiment, the set of multiple operating states includes an ON state and an OFF state, where the ON state permits the reading and writing of data to the memory block, and where the OFF state does not permit reading nor writing of data to the memory block. When in the OFF state, the memory block is unable to retain data stored in the memory block and consumes significantly less power (e.g., at least 90% less, at least 95% less, at least 99% less, etc.) as compared to the ON state. Thus, any data stored in the memory block is lost when the memory block is transitioned to the OFF state.

In some embodiments, the set of multiple operating states includes a retention state (instead of or in addition to the OFF state) in which reading and writing of data is not permitted, but where data already stored in the memory block is maintained. When in the retention state, the memory block consumes less power (e.g., at least 40% less, at least 50% less, at least 60% less, etc.) as compared to the ON state, but consumes more power as compared to the OFF state.

Referring now to FIGS. 1 and 4, when the SSD device 108 is to transition from the normal operating mode to the power saving mode, and after the dynamic data in the volatile memory 184 has been transferred to the HMB 124 as discussed above, at least some of the memory blocks 408, 412, and 416 are transitioned to the OFF state using the control signals discussed above. In some embodiments, one or more of the memory blocks 408, 412, and 416 optionally are transitioned to the retention state instead of the OFF state. For example, dynamic information in a set of one or more of the memory blocks 408, 412, and 416 is not transferred to the HMB 124; instead the set of one or more of the memory blocks 408, 412, and 416 is transitioned to the retention state rather than the OFF state. In FIG. 4, the memory blocks 408-1 and 408-2 are shaded to indicate that, when the SSD device 108 is to transition from the normal operating mode to the power saving mode, dynamic information in the memory blocks 408-1 and 408-2 are not transferred to the HMB 124; instead the memory blocks 408-1 and 408-2 are transitioned to the retention state rather than the OFF state.

Although two memory blocks 408-1 and 408-2 are shaded in FIG. 4, in other embodiments, only one memory block or more than two memory blocks is set to the retention state when the SSD device 108 is to transition from the normal operating mode to the power saving mode; and the dynamic information from the only one memory block or the more than two memory blocks are not transferred to the HMB 124.

Although FIG. 4 illustrates the memory blocks 408, 412, and 416 each being configured to receive a respective control signal, in other embodiments a group of multiple memory blocks (e.g., an entire bank 404, a subset of a bank, etc.) is controlled by a single control signal.

Although FIG. 4 illustrates the volatile memory 184 as being structured to include multiple banks 404, in other embodiments the volatile memory 184 is not structured to have multiple banks.

Figure 5:
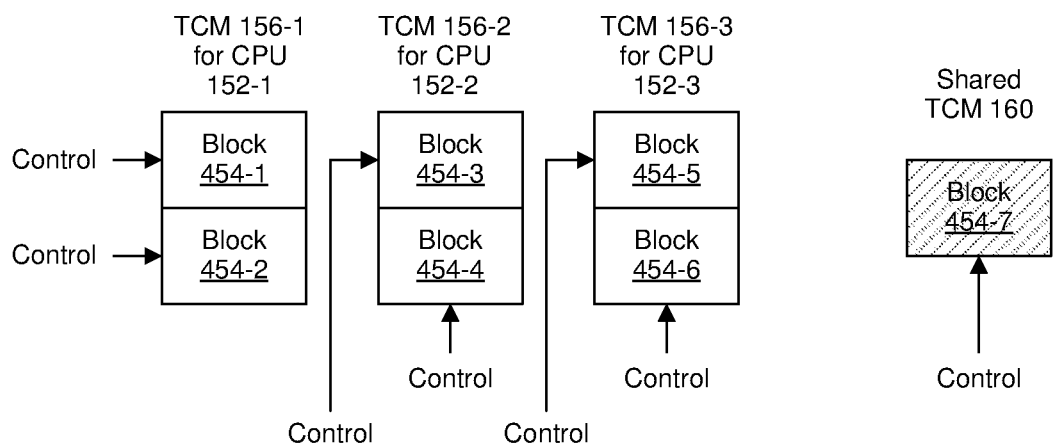
FIG. 5 is a diagram of another example of volatile memory of the SSD device of FIG. 1, according to an embodiment.

FIG. 5 is a diagram of the TCMs 156/160 of FIG. 1, according to an embodiment. The TCMs 156/160 comprise a plurality of memory blocks 454. Although FIG. 5 illustrates two memory blocks 454 for each CPU 152, one memory block 454 or more than two memory blocks 454 (e.g., three, four, five, etc.) are included for each CPU 152 in other embodiments, such as one, two, four, five, etc. Although the shared TCM 160 is illustrated as including one memory block 454-7, the shared TCM 160 includes other suitable numbers of memory blocks (e.g., two, three, four, etc.) in other embodiments. In some embodiments, the shared TCM 160 is omitted.

In an embodiment, each of the memory blocks 454-1, 454-3, and 454-5 comprises a memory block of size 96 kB, and each of the memory blocks 454-2, 454-4, 454-6, and 454-7 comprises a memory block of size 64 kB. In other embodiments, the memory blocks 454 comprise memory blocks of other suitable sizes. In another embodiment, all of the memory blocks 454 have a same size. In another embodiment, the memory block 454-7 has a size that is different than the memory blocks 454-1 through 454-6.

Each of the memory blocks 454 is configured to receive a control signal that is used to transition the memory block amongst a set of multiple operating states. In an embodiment, the set of multiple operating states includes the ON state and the OFF state discussed above with reference to FIG. 4. In some embodiments, the set of multiple operating states includes the retention state discussed above with reference to FIG. 4.

Referring now to FIGS. 1 and 5, when the SSD device 108 is to transition from the normal operating mode to the power saving mode, and after the dynamic data in the TCM 156/160 has been transferred to the HMB 124 as discussed above, at least some of the memory blocks 454 are transitioned to the OFF state using the control signals discussed above. In some embodiments, one or more of the memory blocks 454 optionally are transitioned to the retention state instead of the OFF state. For example, dynamic information in a set of one or more of the memory blocks 454 is not transferred to the HMB 124; instead the set of one or more of the memory blocks 454 is transitioned to the retention state rather than the OFF state. In FIG. 5, the memory block 454-7 is shaded to indicate that, when the SSD device 108 is to transition from the normal operating mode to the power saving mode, dynamic information in the memory block 454-7 are not transferred to the HMB 124; instead the memory block 454-7 is transitioned to the retention state rather than the OFF state.

Although the memory block 454-7 is shaded in FIG. 5, in other embodiments one or more other memory blocks 454 (instead of or in addition to the memory block 454-7) are set to the retention state when the SSD device 108 is to transition from the normal operating mode to the power saving mode; and the dynamic information from the one or more other memory blocks 454 (instead of or in addition to the memory block 454-7) are not transferred to the HMB 124.

Although FIG. 5 illustrates the memory blocks 454 each being configured to receive a respective control signal, in other embodiments a group of multiple memory blocks 454 (e.g., all memory blocks 454 associated with a single CPU) is controlled by a single control signal.

Referring again to FIG. 1, other volatile memory of the SSD device 108, such as volatile memory of (or coupled to) the NVM controller 140 (e.g., the RAID buffer(s) 144), is controlled to transition from the ON state to the OFF state (or to the retention state), and vice versa, using one or more control signals such as described above with reference to FIGS. 4 and 5.

Referring now to FIGS. 1, 4, and 5, the system controller 168 is configured to generate the control signals, according to an embodiment. For example, the system controller 168 is configured to determine that the SSD device is to transition from the normal operating mode to the power saving mode and, in response and after the dynamic information has been transferred to the HMB 124, generates control signals to transition various volatile memories of the SSD device 108 from the ON state to the OFF state (or to the retention state), according to an embodiment. Similarly, the system controller 168 is configured to determine that the SSD device is to transition from the power saving mode to the normal operating mode and, in response, generates control signals to transition various volatile memories of the SSD device 108 from the OFF state (or the retention state) to the ON state, according to an embodiment.

Figure 6:
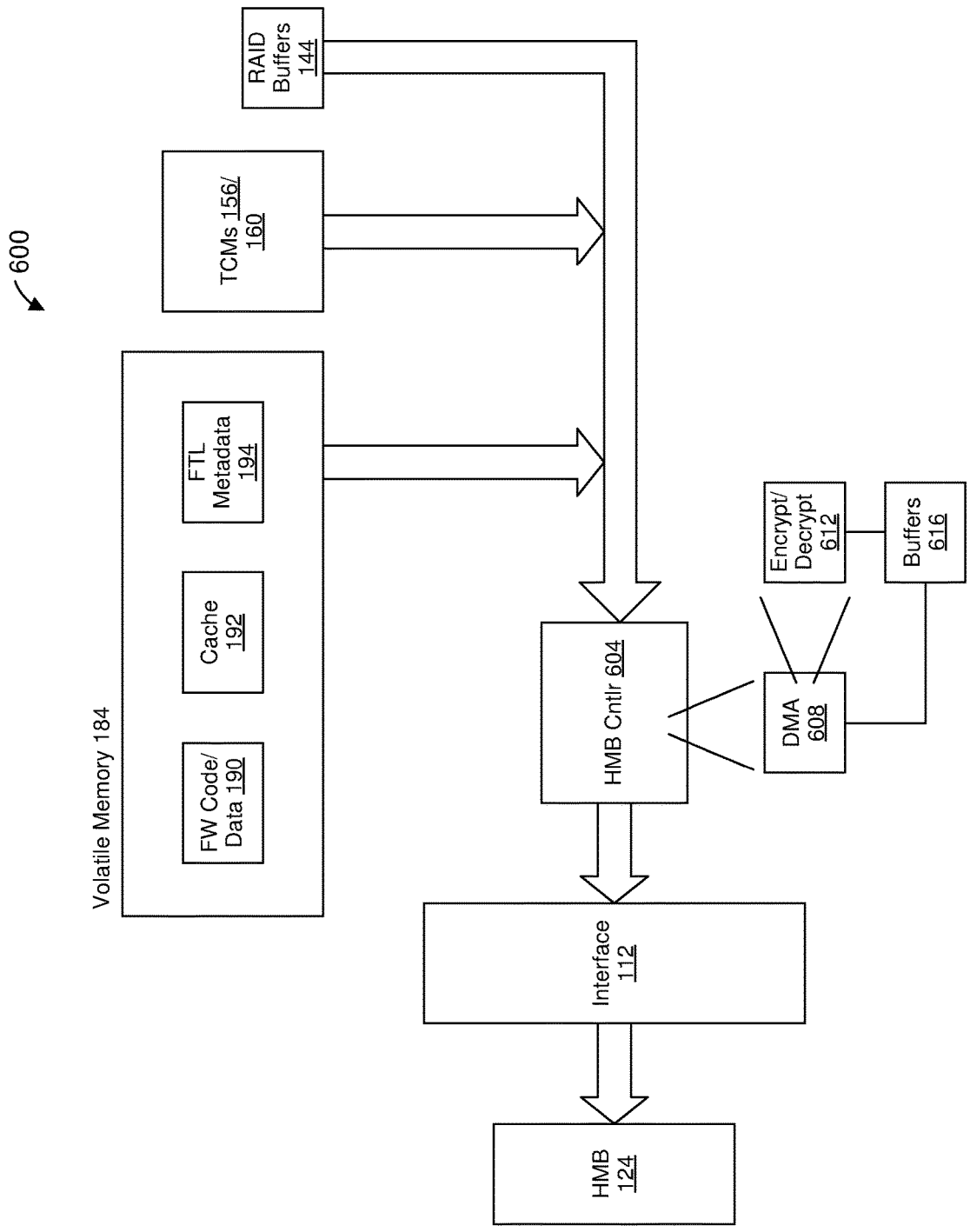
FIG. 6 is a simplified functional diagram illustrating an example of encryption of data being transferred from volatile memory of the SSD device of FIG. 1 to the host memory in connection with the SSD device transitioning to the power saving mode, according to an embodiment.

In some embodiments, encryption, error detection, and/or error correction techniques are used in connection with transferring dynamic information from volatile memor(ies) of the SSD device 108 to the HMB 124. FIG. 6 is a simplified functional diagram illustrating an example HMB controller 604 transferring data from volatile memory of the SSD device 108 to the HMB 124 via the communication interface 112 in connection with the SSD device 108 transitioning to the power saving mode, according to another embodiment. The HMB controller 604 is used with an SSD device 108 having the structure illustrated in FIG. 1, or with another suitable SSD device, according to various embodiments. FIG. 6 is similar to the functional diagram of FIG. 2, and like-numbered elements are not described in detail for brevity.

The HMB controller 604 is the same as or similar to the HMB controller 180 described above, except the HMB controller 604 includes DMA circuitry 608 that includes, or is coupled to, encryption/decryption circuitry 612 that is configured to encrypt dynamic information that is being transferred from volatile memor(ies) of the SSD device 108 to the HMB 124. In an embodiment, the HMB controller 604 also includes, or is coupled to, buffers 616 that are used in conjunction with encrypting the dynamic information. For example, the HMB controller 604 uses a ping-pong method for encrypting the dynamic information and transferring encrypted dynamic information to the HMB 124. In an embodiment, the encryption/decryption circuitry 612 encrypts dynamic information from a volatile memory in a first buffer 1616 (Buffer A). Then, the DMA circuitry 608 transfers the encrypted dynamic information from Buffer A to the HMB 124 while the encryption/decryption circuitry 612 encrypts dynamic information from the volatile memory in a second buffer 1616 (Buffer B). Then, the DMA circuitry 608 transfers the encrypted dynamic information from Buffer B to the HMB 124 while the encryption/decryption circuitry 612 encrypts dynamic information from the volatile memory in Buffer A, and so on. In other words, the encryption/decryption circuitry 612 alternates between encrypting dynamic information in Buffer A and encrypting dynamic information in Buffer B, and the DMA circuitry 608 alternates between transferring the encrypted dynamic information in Buffer B and transferring the encrypted dynamic information in Buffer A. The encryption/decryption circuitry 612 is also configured to decrypt dynamic information that is being transferred back from the HMB 124 to the volatile memor(ies) of the SSD device 108 in a similar manner.

Figure 7:
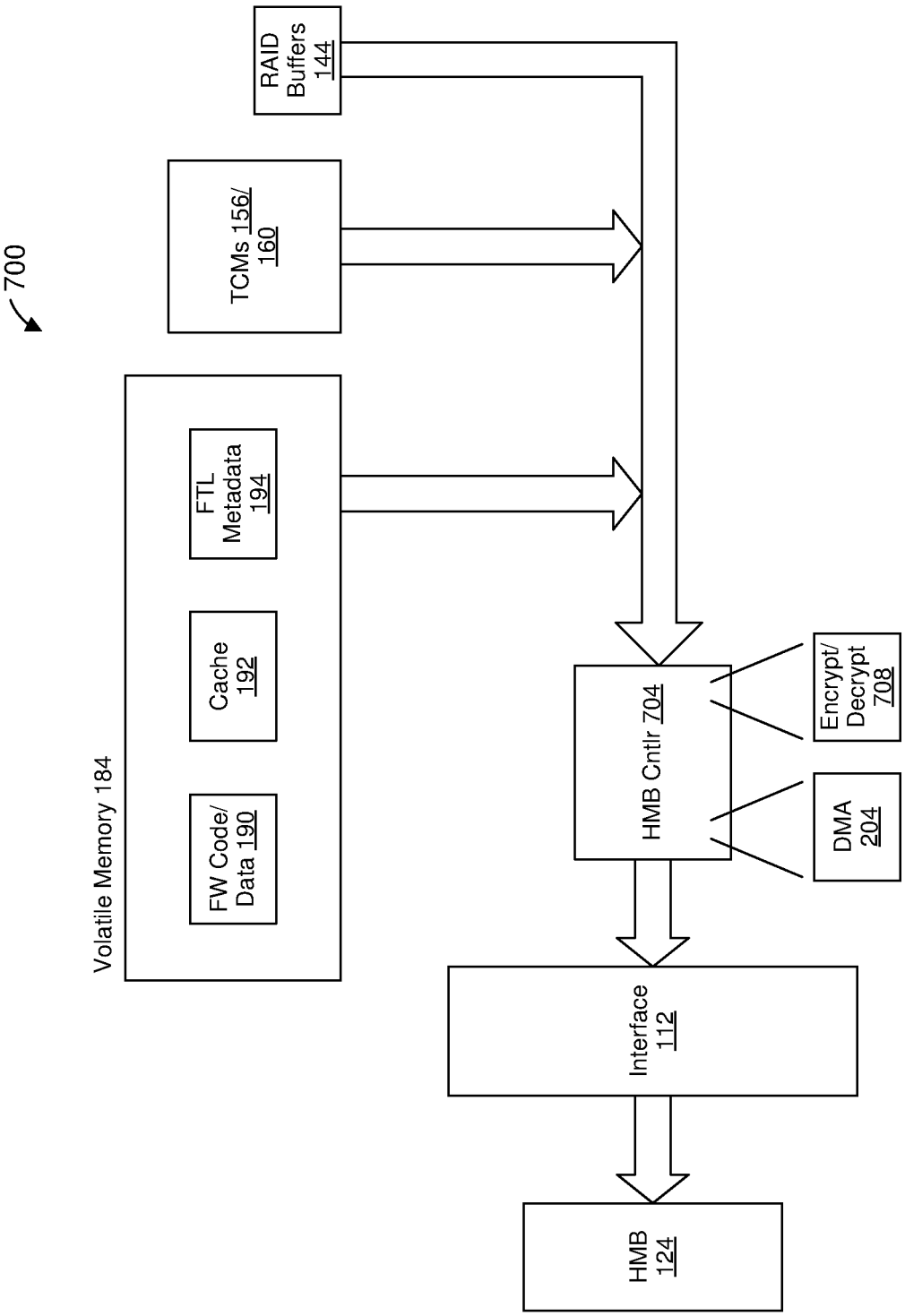
FIG. 7 is a simplified functional diagram illustrating another example of encryption of data being transferred from volatile memory of the SSD device of FIG. 1 to the host memory in connection with the SSD device transitioning to the power saving mode, according to an embodiment.

FIG. 7 is a simplified functional diagram illustrating another example HMB controller 704 transferring data from volatile memory of the SSD device 108 to the HMB 124 via the communication interface 112 in connection with the SSD device 108 transitioning to the power saving mode, according to another embodiment. The HMB controller 704 is used with an SSD device 108 having the structure illustrated in FIG. 1, or with another suitable SSD device, according to various embodiments. FIG. 7 is similar to the functional diagram of FIG. 2, and like-numbered elements are not described in detail for brevity.

The HMB controller 704 is the same as or similar to the HMB controller 180 described above, except the HMB controller 704 includes encryption/decryption circuitry 708 that is configured to perform in-line encryption of dynamic information that is being transferred from volatile memor(ies) of the SSD device 108 to the HMB 124, and to perform in-line decryption of dynamic information that is being transferred from the HMB 124 to the volatile memor(ies) of the SSD device 108.

Figure 8:
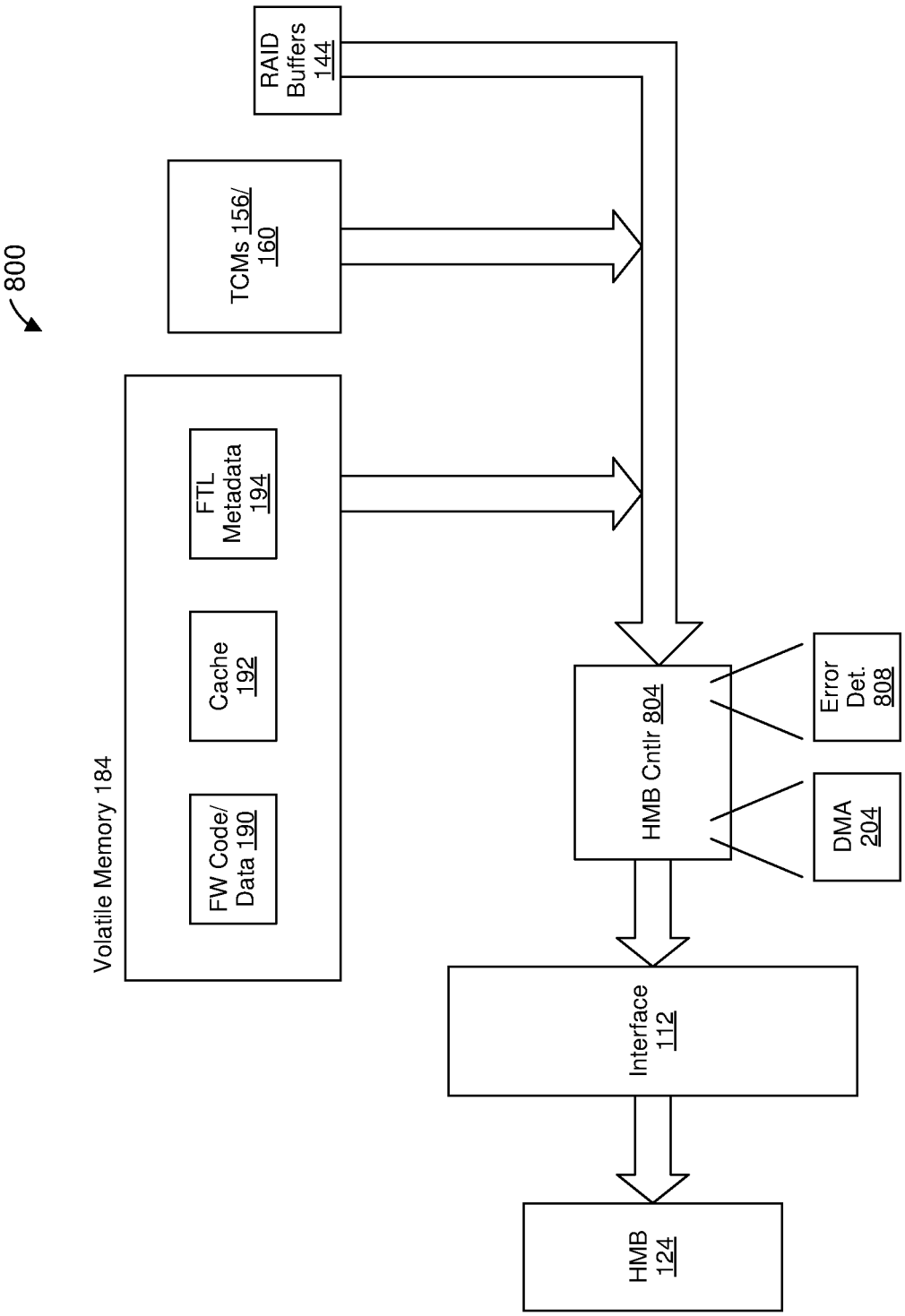
FIG. 8 is a simplified functional diagram illustrating an example of error detection encoding of data being transferred from volatile memory of the SSD device of FIG. 1 to the host memory in connection with the SSD device transitioning to the power saving mode, according to an embodiment.

FIG. 8 is a simplified functional diagram illustrating another example HMB controller 804 transferring data from volatile memory of the SSD device 108 to the HMB 124 via the communication interface 112 in connection with the SSD device 108 transitioning to the power saving mode, according to another embodiment. The HMB controller 804 is used with an SSD device 108 having the structure illustrated in FIG. 1, or with another suitable SSD device, according to various embodiments. FIG. 8 is similar to the functional diagram of FIG. 2, and like-numbered elements are not described in detail for brevity.

The HMB controller 804 is the same as or similar to the HMB controller 180 described above, except the HMB controller 804 includes error detection circuitry 808 that is configured to generate respective error detection information for units of dynamic information that are being transferred from volatile memor(ies) of the SSD device 108 to the HMB 124, and to append the error detection information to respective units of dynamic information so that the error detection information is also stored in the HMB 124. As an illustrative example, the error detection circuitry 808 generates respective error detection information for each 128 kB unit of dynamic information and appends the respective error detection information to each 128 kB unit of dynamic information. In other embodiments, the units of dynamic information have another suitable size.

In an embodiment, the error detection circuitry 808 is configured to generate cyclic redundancy check (CRC) information according to a suitable CRC generation algorithm.

In connection with transferring dynamic information back from the HMB 124 to the volatile memor(ies) of the SSD device 108, the error detection circuitry 808 is also configured to generate respective error detection information for units of dynamic information that are being transferred from the HMB 124, and to compare the generated error detection information to the error detection information that is appended to the respective units of dynamic information in order to detect errors/changes to the dynamic information. In some embodiments, the error detection circuitry 808 is also configured to remove appended error detection information from units of dynamic information that are being transferred from the HMB 124 at least for the units of dynamic information that the error detection circuitry 808 has determined do not contain errors/changes.

Figure 9:
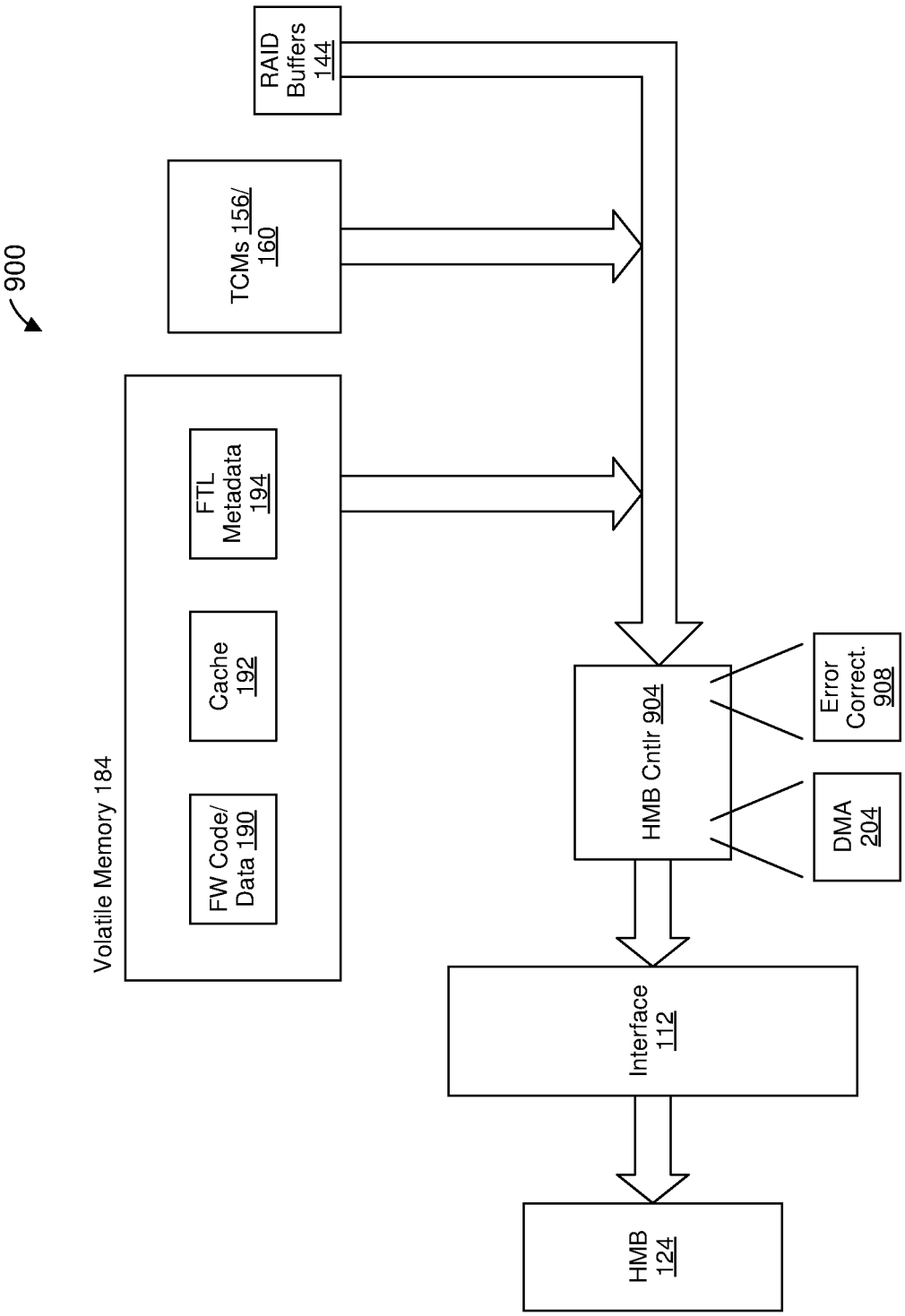
FIG. 9 is a simplified functional diagram illustrating an example of error correction encoding of data being transferred from volatile memory of the SSD device of FIG. 1 to the host memory in connection with the SSD device transitioning to the power saving mode, according to an embodiment.

FIG. 9 is a simplified functional diagram illustrating another example HMB controller 904 transferring data from volatile memory of the SSD device 108 to the HMB 124 via the communication interface 112 in connection with the SSD device 108 transitioning to the power saving mode, according to another embodiment. The HMB controller 904 is used with an SSD device 108 having the structure illustrated in FIG. 1, or with another suitable SSD device, according to various embodiments. FIG. 9 is similar to the functional diagram of FIG. 2, and like-numbered elements are not described in detail for brevity.

The HMB controller 904 is the same as or similar to the HMB controller 180 described above, except the HMB controller 904 includes error correction code circuitry 908 that is configured to encode, according to an error correction code, units of dynamic information that are being transferred from volatile memor(ies) of the SSD device 108 to the HMB 124 with redundancy information so that the encoded dynamic information is stored in the HMB 124. As an illustrative example, the error correction code circuitry 908 encodes each 32 byte unit of dynamic information according to a suitable error correction code. In other embodiments, the units of dynamic information that are encoded have another suitable size.

In an embodiment, the error correction code circuitry 908 is configured to generate redundancy information according to a Reed-Solomon error correction encoding method. In an embodiment that utilizes the Reed-Solomon error correction encoding method, the error correction code circuitry 908 is configured to encode each 32 byte unit to generate four bytes of redundancy information that is appended to the 32 byte unit. In other embodiments, the error correction code circuitry 908 is configured to encode the dynamic information according to another suitable error correction code such as another block code (e.g., a Golay code, a Hamming code, a Bose-Chaudhuri-Hocquenghem (BCH) code, a low density parity check (LDPC) code, etc.), a convolutional code, a turbo code, etc., and/or using units of data of a suitable size other than 32 bytes.

In connection with transferring dynamic information back from the HMB 124 to the volatile memor(ies) of the SSD device 108, the error correction code circuitry 908 is also configured to apply an error correction method to units of dynamic information that are being transferred from the HMB 124 and that were encoded according to the error correction code. In some embodiments that utilize a block code, the error correction code circuitry 908 is also configured to remove appended redundancy information from units of dynamic information that are being transferred from the HMB 124 at least for the units of dynamic information that did not include errors/changes and/or that the error correction code circuitry 908 was able to correct.

In various other embodiments, methods described with reference to FIGS. 6 and 7 are combined with one or more methods described with reference to FIGS. 8 and 9. For example, dynamic information transferred to the HMB 124 is both i) encrypted and ii) protected using an error detection code and/or an error correction code, in some embodiments.

Figure 10:
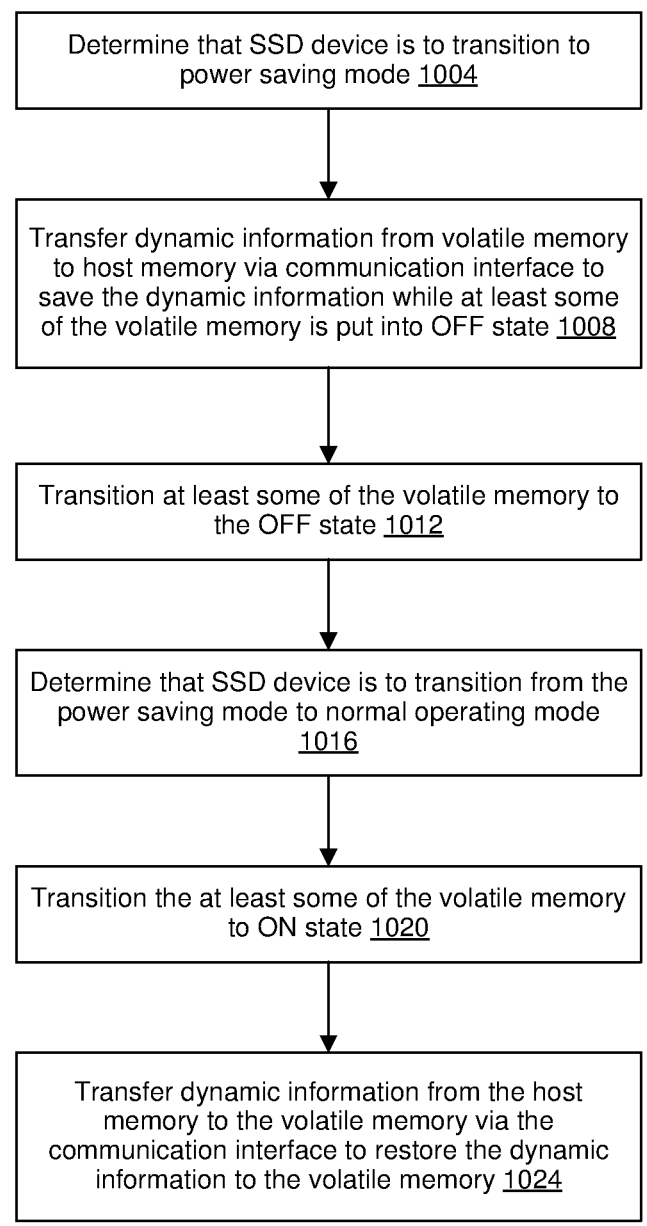
FIG. 10 is a flow diagram of an example method for reducing power consumed by the SSD device of FIG. 1, according to an embodiment.

FIG. 10 is a flow diagram of an example method 1000 for reducing power consumed by an SSD device, according to an embodiment. In one embodiment, the method 1000 is implemented in the system 100 of FIG. 1, and the method 1000 of FIG. 10 is described with reference to FIG. 1 merely for explanatory purposes. In other embodiments, the method 1000 is implemented in another suitable system. In an embodiment, the method 1000 is implemented by an SSD device controller that is configured to receive memory access commands from a host computer via a communication interface, and to execute the memory access commands in connection with the non-volatile memory.

At block 1004, an SSD device (e.g., the SSD device 108) determines that the SSD device is to transition to a power saving mode. For example, in an embodiment, the SSD device controller 132 determines that the SSD device 108 is to transition to the power saving mode. In an embodiment, the system controller 168 determines that the SSD device 108 is to transition to the power saving mode. In another embodiment, another controller and/or other hardware circuitry of the SSD device controller 132 determines that the SSD device 108 is to transition to the power saving mode.

At block 1008, in response to determining at block 1004 that the SSD device is to transition to a power saving mode, dynamic information is transferred from volatile memory of the SSD device to host memory of a host computer via a communication interface. In an embodiment, the SSD device transfers the dynamic information at block 1008 to save the dynamic information while at least some of the volatile memory is put into an OFF state. For example, the SSD device controller 132 transfers dynamic information from volatile memory of the SSD device 108 to the HMB 124 via the communication interface 112, according to an embodiment. In an embodiment, the HMB controller 180 transfers dynamic information from volatile memory of the SSD device 108 to the HMB 124 via the communication interface 112.

As discussed above, the dynamic information includes information that cannot simply be discarded and is necessary for the SSD device to transition back to the normal operating mode from the power saving mode and resume operation, at least in some embodiments, such as one or more of i) cached write data that has not yet been written to NVM of the SSD device, ii) state information of one or more controllers of the SSD device, etc. In various illustrate embodiments, the dynamic information includes one of, or any suitable combination of two or more of: i) RAID data stored in buffers (e.g., the RAID buffers 144) of the SSD device and that is in the process of being striped to NVM chips of the SSD device, ii) data and/or code stored in tightly coupled memory of one or more CPUs of the SSD device, iii), data and/or code stored in another memory separate from the TCM memory of the one or more CPUs of the SSD device, iv) write data that that is to be written to NVM chips and that was transferred from the host via the communication interface, v) FTL metadata, etc.

Transferring dynamic information at block 1008 comprises transferring dynamic information from the volatile memory 184 to the HMB 124, according to an embodiment. In other embodiments, transferring dynamic information at block 1008 additionally or alternatively comprises one of, or any suitable combination of two or more of: i) transferring dynamic information from one or more TCMs of one or more CPUs of the SSD device to the host memory, ii) transferring dynamic information from one or more RAID buffers to the host memory, etc.

Transferring dynamic information at block 1008 comprises transferring dynamic information from a first volatile memory of the SSD device to a second volatile memory of the SSD device, and then transferring the dynamic information from the second volatile memory to the host memory, according to an embodiment. In an embodiment, transferring dynamic information at block 1008 comprises transferring dynamic information from TCM of a CPU of the SSD device to the host memory without first transferring the dynamic information from the TCM to a RAM of the SSD device.

At block 1012, in response to determining at block 1004 that the SSD device is to transition to a power saving mode and after transferring the dynamic information at block 1008, at least some of the volatile memory of the SSD device is transitioned to the OFF state. In an embodiment, the SSD device controller 132 generates control signals that transition at least some of the volatile memory of the SSD device to the OFF state. In an embodiment, the system controller 168 generates control signals that transition at least some of the volatile memory of the SSD device to the OFF state.

In an embodiment, transitioning at least some of the volatile memory of the SSD device to the OFF state at block 1012 comprises transitioning some of the volatile memory of the SSD device to the OFF state while other volatile memory of the SSD device is transitioned to a retention state.

At block 1016, the SSD device determines that the SSD device is to transition from the power saving mode to a normal operating mode. For example, in an embodiment, the SSD device controller 132 determines that the SSD device 108 is to transition from the power saving mode to the normal operating mode. In an embodiment, the system controller 168 determines that the SSD device 108 is to transition from the power saving mode to the normal operating mode. In another embodiment, another controller and/or other hardware circuitry of the SSD device controller 132 determines that the SSD device 108 is to transition from the power saving mode to the normal operating mode.

At block 1020, in response to determining at block 1016 that the SSD device is to transition from the power saving mode to the normal operating mode, at least some of the volatile memory of the SSD device is transitioned from the OFF state to an ON state. In an embodiment, transitioning at least some of the volatile memory of the SSD device from the OFF state to an ON state at block 1020 comprises transitioning the volatile memory that was transitioned to the OFF state at block 1012 to the ON state.

In an embodiment, the SSD device controller 132 generates control signals that transition at least some of the volatile memory of the SSD device from the OFF state to the ON state at block 1020. In an embodiment, the system controller 168 generates control signals that transition at least some of the volatile memory of the SSD device from the OFF state to the ON state at block 1020.

At block 1024, in response to determining at block 1016 that the SSD device is to transition from the power saving mode to the normal operating mode and after transitioning at least some of the volatile memory of the SSD device from the OFF state to an ON state at block 1020, dynamic information is transferred from the host memory to the volatile memory of the SSD device. In an embodiment, the SSD device transfers the dynamic information at block 1024 to restore the dynamic information to the volatile memory of the SSD device. For example, the SSD device controller 132 transfers dynamic information from the HMB 124 to the volatile memory of the SSD device 108 via the communication interface 112, according to an embodiment. In an embodiment, the HMB controller 180 transfers the dynamic information from the HMB 124 to the volatile memory of the SSD device 108 via the communication interface 112.

In an embodiment, transferring dynamic information from the host memory to the volatile memory of the SSD device at block 1024 comprises transferring the dynamic information that was transferred to the host memory at block 1008 back to the volatile memory of the SSD device.

In another embodiment, the method 1000 further comprises i) encrypting at least some of the dynamic information that is transferred to the host memory at block 1008, and ii) decrypting at least some of the dynamic information transferred from the host memory at block 1024.

In another embodiment, the method 1000 further comprises i) generating error detection information for at least some of the dynamic information that is transferred to the host memory at block 1008, and ii) using the error detection information to detect changes and/or errors in the at least some of the dynamic information that is transferred from the host memory at block 1024.

In another embodiment, the method 1000 further comprises i) encoding at least some of the dynamic information that is transferred to the host memory at block 1008 according to an error correction code, and ii) using the error correction code to correct changes and/or errors in the at least some of the dynamic information that is transferred from the host memory at block 1024.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. An apparatus for reducing power consumed by a solid state drive (SSD) device, the apparatus comprising:
   a controller comprising at least one of i) a processor and a memory, the processor being configured to execute machine readable instructions stored in the memory, and ii) hardware circuitry, wherein the controller is configured to, in response to determining that the SSD device is to transition to a power saving mode:
   transfer information from at least some of a volatile memory of an SSD device controller of the SSD device to a host memory of a host computer via a communication interface, and
   transition the at least some of the volatile memory to an OFF state to reduce power consumption of the SSD device;
   wherein the controller is further configured to, in response to determining that the SSD device is to transition from the power saving mode to a normal operating mode:
   transition the at least some of the volatile memory to an ON state in which the at least some of the volatile memory is configured to retain data, and transfer the information from the host memory to the volatile memory of the SSD device controller via the communication interface.

2. The apparatus for reducing power of claim 1, wherein:
the volatile memory comprises a random access memory (RAM); and
the controller is configured to, in response to determining that the SSD device is to transition to the power saving mode, transfer information from the RAM to the host memory via the communication interface to save the information that was stored in the RAM while at least a portion of the RAM is put into an OFF state in which the at least the portion of the RAM is incapable of retaining data.

3. The apparatus for reducing power of claim 1, wherein:
the controller is configured to, in response to determining that the SSD device is to transition to the power saving mode, transfer information from a tightly coupled memory (TCM) associated with a central processing unit (CPU) of the SSD device controller to the host memory via the communication interface to save the information that was stored in the TCM while at least a portion of the TCM is put into an OFF state in which the at least the portion of the TCM is incapable of retaining data.

4. The apparatus for reducing power of claim 3, wherein the controller is configured to:
transfer the information from the TCM to the volatile memory, and
transfer the information from the volatile memory to the host memory via the communication interface.

5. The apparatus for reducing power of claim 1, wherein:
the volatile memory comprises a redundant array of independent disks (RAID) buffer; and
the controller is configured to, in response to determining that the SSD device is to transition to the power saving mode, transfer information from the RAID buffer to the host memory via the communication interface to save the information that was stored in the RAID buffer while at least a portion of the RAID buffer is put into an OFF state in which the at least the portion of the RAID buffer is incapable of retaining data.

6. The apparatus for reducing power of claim 1, wherein the controller is configured to, in response to determining that the SSD device is to transition to the power saving mode:
transfer metadata regarding a flash translation layer (FTL) from the volatile memory of the SSD device to the host memory via the communication interface to save the metadata while the at least some of the volatile memory is put into the OFF state in which the at least some of the volatile memory is incapable of retaining data.

7. The apparatus for reducing power of claim 1, wherein the controller is configured to, in response to determining that the SSD device is to transition to the power saving mode:
transfer write data to the host memory via the communication interface to save the write data while the at least some of the volatile memory is put into the OFF state in which the at least some of the volatile memory is incapable of retaining data, wherein the write data comprises data to be written to non-volatile memory and that was cached in the volatile memory.

8. The apparatus for reducing power of claim 1, wherein the controller comprises:

encryption circuitry configured to encrypt the information that is to be transferred from the volatile memory of the SSD device to the host memory via the communication interface; and
decryption circuitry configured to decrypt the information that is transferred from the host memory to the volatile memory of the SSD device via the communication interface.

9. The apparatus for reducing power of claim 1, wherein:
the controller further comprises error detection circuitry configured to generate error detection information corresponding to the information that is to be transferred from the volatile memory of the SSD device to the host memory via the communication interface;
the controller is further configured to:
transfer the error detection information to the host memory via the communication interface in connection with transferring the information to the host memory from the volatile memory, and
transfer the error detection information from the host memory to the SSD device via the communication interface in connection with transferring the information from the host memory to the volatile memory of the SSD device via the communication interface; and
the error detection circuitry is further configured to use the error detection information to detect errors and/or changes to the information that is transferred from the host memory to the volatile memory of the SSD device via the communication interface.

10. The apparatus for reducing power of claim 1, wherein the controller further comprises error correction code circuitry that is configured to:
encode the information that is to be transferred from the volatile memory of the SSD device to the host memory via the communication interface according to an error correction code; and
decode the information that is transferred from the host memory to the volatile memory of the SSD device via the communication interface according to the error correction code.

11. A method for reducing power consumed by a solid state drive (SSD) device that comprises non-volatile memory and volatile memory, the method comprising:
in response to determining that the SSD device is to transition to a power saving mode,
controlling direct memory access (DMA) circuitry to transfer information from the volatile memory of the SSD device to a host memory of a host computer via a communication interface, and
generating control signals to transition at least some of the volatile memory of the SSD device to the OFF state to reduce power consumption of the SSD device; and
in response to determining that the SSD device is to transition from the power saving mode to a normal operating mode,
generating control signals to transition the at least some of the volatile memory of the SSD device to an ON state in which the volatile memory is capable of retaining data, and
controlling the DMA circuitry to transfer the information from the host memory to the volatile memory of the SSD device via the communication interface.

12. The method of claim 11, wherein controlling the DMA circuitry to transfer information from the volatile memory of the SSD device to the host memory via the communication interface comprises:
   controlling the DMA circuitry to transfer information from a random access memory (RAM) of the SSD device to the host memory via the communication interface to save the information while at least some of the RAM is put into an OFF state in which the at least some of the RAM is incapable of retaining data.

13. The method of claim 11, wherein controlling the DMA circuitry to transfer information from the volatile memory of the SSD device to the host memory via the communication interface comprises:
   controlling the DMA circuitry to transfer information from a tightly coupled memory (TCM) of a central processing unit (CPU) of the SSD device to the host memory via the communication interface to save the information while at least some of the TCM is put into an OFF state in which the at least some of the TCM is incapable of retaining data.

14. The method of claim 13, wherein controlling the DMA circuitry to transfer information from the TCM of the CPU of the SSD device to the host memory via the communication interface comprises:
   controlling the DMA circuitry to transfer the information from the TCM to a random access memory (RAM) of the SSD device; and
   controlling the DMA circuitry to transfer the information from the RAM to the host memory via the communication interface.

15. The method of claim 11, wherein controlling the DMA circuitry to transfer information from the volatile memory of the SSD device to the host memory via the communication interface comprises:
   controlling the DMA circuitry to transfer information from a redundant array of independent disks (RAID) buffer of the SSD device to the host memory via the communication interface to save the information from the RAID buffer while at least some of the RAID buffer is put into an OFF state in which the at least some of the RAID buffer is incapable of retaining data.

16. The method of claim 11, wherein controlling the DMA circuitry to transfer information from the volatile memory of the SSD device to the host memory via the communication interface comprises:
   controlling the DMA circuitry to transfer metadata regarding a flash translation layer (FTL) from the volatile memory of the SSD device to the host memory via the communication interface to save the metadata while the at least some of the volatile memory is put into the OFF state in which the at least some of the volatile memory is incapable of retaining data.

17. The method of claim 11, wherein controlling the DMA circuitry to transfer information from the volatile memory of the SSD device to the host memory via the communication interface comprises:
   controlling the DMA circuitry to transfer write data that is to be written to non-volatile memory of the SSD device and that was cached in the volatile memory of the SSD device to save the write data while the at least some of the volatile memory is put into the OFF state in which the at least some of the volatile memory is incapable of retaining data.

18. The method of claim 11, further comprising:
   encrypting, at a controller, the information that is to be transferred from the volatile memory of the SSD device to the host memory via the communication interface; and
   decrypting, at the controller, the information that is transferred from the host memory to the volatile memory of the SSD device via the communication interface.

19. The method of claim 11, further comprising:
   generating, at a controller, error detection information corresponding to the information that is to be transferred from the volatile memory of the SSD device to the host memory via the communication interface;
   controlling the DMA circuitry to transfer the error detection information to the host memory via the communication interface;
   controlling the DMA circuitry to transfer the error detection information from the host memory to the SSD device via the communication interface in connection with transferring the information from the host memory to the volatile memory of the SSD device via the communication interface; and
   using the error detection information to detect errors and/or changes to the information that is transferred from the host memory to the volatile memory of the SSD device via the communication interface.

20. The method of claim 11, further comprising:
   encoding, at a controller, the information that is to be transferred from the volatile memory of the SSD device to the host memory via the communication interface according to an error correction code; and
   decoding, at the controller, the information that is transferred from the host memory to the volatile memory of the SSD device via the communication interface according to the error correction code.

\* \* \* \* \*